UNITED STATES PATENT OFFICE.

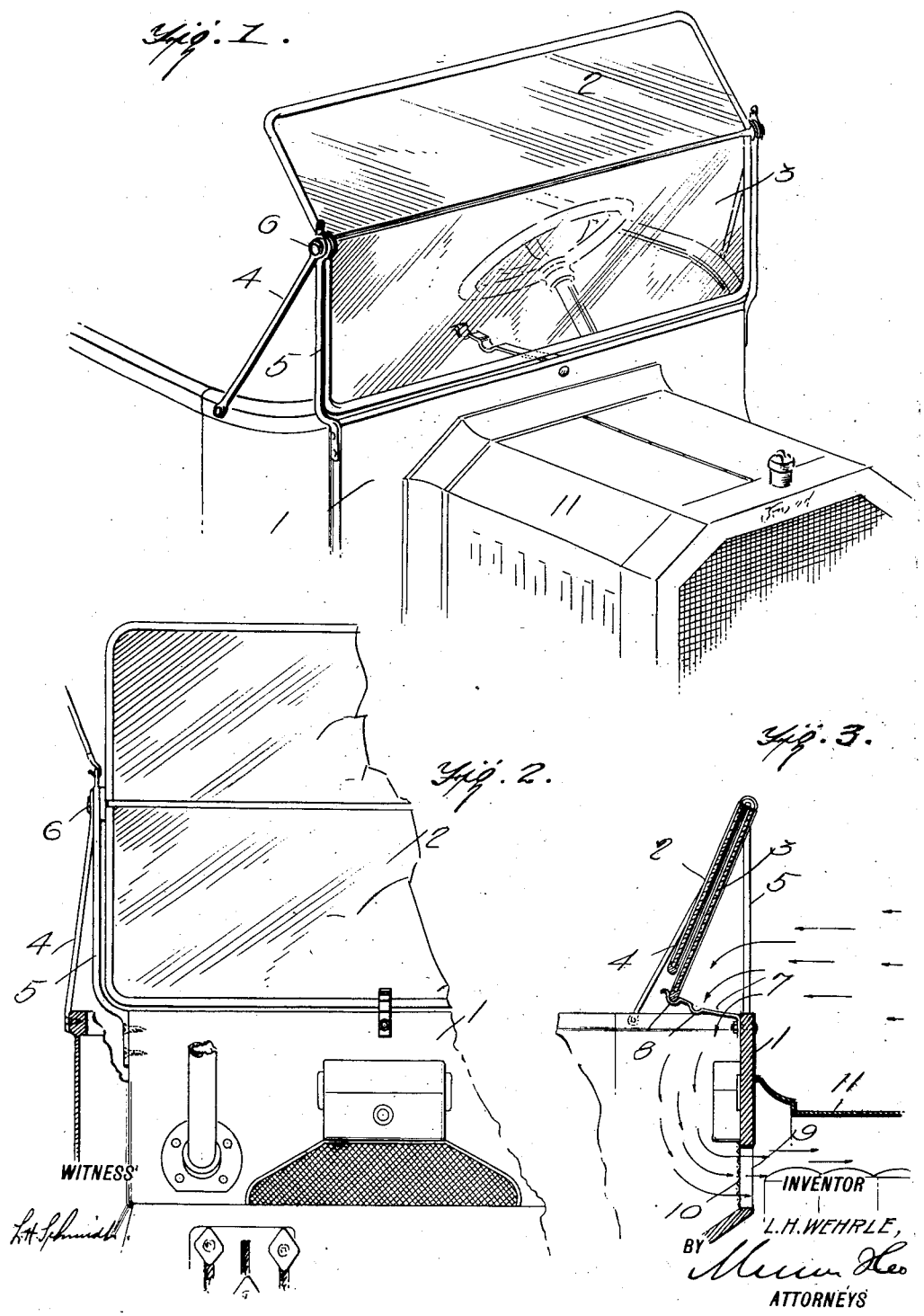

LAURENCE HARRISON WEHRLE, OF MURFREESBORO, TENNESSEE.

VENTILATING WIND-SHIELD FOR MOTOR-VEHICLES.

1,273,965.   Specification of Letters Patent.   Patented July 30, 1918.

Application filed July 30, 1917. Serial No. 183,457.

*To all whom it may concern:*

Be it known that I, LAURENCE HARRISON WEHRLE, a citizen of the United States, and a resident of Murfreesboro, in the county of Rutherford and State of Tennessee, have invented new and useful Improvements in Ventilating Wind-Shields for Motor-Vehicles, of which the following is a specification.

My invention is an improvement in ventilating wind shields for motor vehicles, and the invention has for its object to provide means for permitting the lower section of the shield to be swung inwardly, to provide for a downward current of air and to provide an opening in the dashboard through which air may circulate.

In the drawings:

Figure 1 is a perspective view of the front end of a motor vehicle provided with the improved shield;

Fig. 2 is a rear view of the shield;

Fig. 3 is a transverse vertical section.

The present embodiment of the invention is shown in connection with the dashboard 1 of a motor vehicle, and the shield consists of upper and lower sections 2 and 3, respectively. A bracket is connected to the body of the vehicle at each end of the dashboard, and each of the brackets consists of sections 4 and 5 which are secured to the body and to the dashboard, respectively, the said sections converging toward their upper ends. A pivotal support 6 for the two sections of the wind shield engages eyes or bearings in the upper ends of the sections of the brackets, to thus properly mount the sections of the wind shield.

The usual mechanism is provided for holding the sections of the shield in adjusted position, and since the lower end or edge of the section 3 is loose it may be swung rearwardly to permit air to enter, as indicated by the arrows in Fig. 3. Means is provided for holding this section of the shield in inwardly inclined position. The said mechanism comprises a spring arm 7 which is secured to the dashboard at approximately the center thereof and to the inner face thereof, and the said arm extends inwardly, inclining slightly upwardly, as shown. This arm has two transverse grooves 8 for receiving the lower rounded edge of the section 3 to hold the said section in the position desired. A transverse opening or openings 9 is provided in the dashboard, the said opening or openings being covered by wire gauze 10, and the said opening or openings permit the air to pass out beneath the hood 11 of the vehicle.

In use, the section 3 of the wind shield may be swung inwardly to engage either of the grooves 8, and it will be evident that as the vehicle moves forward the air will be driven inwardly and downwardly, as indicated by the arrow in Fig. 3, and will pass into the hood through the opening 9, thus providing for ventilation within the body at the front thereof and adjacent to the engine, where the greatest heat obtains.

I claim:

In a motor vehicle, brackets secured to the body at the end of the dashboard and provided with bearings for the pivotal supporting of the wind shield sections for permitting the lower section to be swung inwardly, a resilient arm secured to the dashboard and extending rearwardly and upwardly and having transverse grooves for engagement by the lower edge of the wind shield section to hold the said section in adjusted position, the dashboard having openings at the hood, and a screen over the openings.

LAURENCE HARRISON WEHRLE.